US007451046B2

(12) United States Patent
Nath et al.

(10) Patent No.: US 7,451,046 B2
(45) Date of Patent: Nov. 11, 2008

(54) IMMINENT COLLISION WARNING SYSTEM AND METHOD

(76) Inventors: Sanjeev Nath, 530 E. 76th St., New York, NY (US) 10021; Rajesh Patel, 77 Highland St., Rocky Hill, CT (US) 06067

( * ) Notice: Subject to any disclaimer, the term of this patent is extended or adjusted under 35 U.S.C. 154(b) by 657 days.

(21) Appl. No.: 10/834,735

(22) Filed: Apr. 29, 2004

(65) Prior Publication Data

US 2005/0246100 A1 Nov. 3, 2005

(51) Int. Cl.
*G06F 17/10* (2006.01)
*G06G 7/78* (2006.01)
*G08G 1/16* (2006.01)

(52) U.S. Cl. ....................... 701/301; 701/300; 340/436; 340/903; 340/901

(58) Field of Classification Search ................. 701/300, 701/301; 340/436, 901, 903; 342/29, 41, 342/455
See application file for complete search history.

(56) References Cited

U.S. PATENT DOCUMENTS 3,034,287 A 5/1962 Odom et al.
3,955,560 A 5/1976 Stein et al.
4,031,991 A 6/1977 Malott
4,137,520 A 1/1979 Deveau
4,183,203 A 1/1980 Maezawa et al.
4,742,573 A 5/1988 Popovic
4,837,568 A 6/1989 Snaper
5,204,670 A 4/1993 Stinton
D355,903 S 2/1995 Pollack et al.
5,635,693 A 6/1997 Benson et al.
6,052,065 A 4/2000 Glover
6,114,960 A * 9/2000 Gilmour ..................... 340/571
6,356,855 B1 3/2002 Yamagata et al.
6,408,232 B1 6/2002 Cannon et al.
6,525,674 B1 2/2003 Kelly et al.
6,526,335 B1 2/2003 Treyz et al.
6,636,752 B1 10/2003 Madarasz et al.
6,687,497 B1 * 2/2004 Parvulescu et al. .......... 455/420
6,690,295 B1 2/2004 DeBoer
6,690,296 B2 2/2004 Corwin et al.
6,690,956 B2 * 2/2004 Chua et al. ............... 455/569.2
6,831,572 B2 * 12/2004 Strumolo et al. ............ 340/903

(Continued)

FOREIGN PATENT DOCUMENTS

DE 10005175 A1 * 8/2001

(Continued)

OTHER PUBLICATIONS

Statistical signal processing for automotive safety systems; Gustafsson, F.; Statistical Signal Processing, 2005 IEEE/SP 13th Workshop on; Jul. 17-20, 2005 pp. 1428-1435.*

(Continued)

*Primary Examiner*—Cuong H Nguyen
(74) *Attorney, Agent, or Firm*—Kelley Drye & Warren LLP

(57) ABSTRACT

The invention is directed to a system and method for sensing the presence of objects in a path of an automobile with a system to warn both the operator of the vehicle and the object of regard.

20 Claims, 10 Drawing Sheets

U.S. PATENT DOCUMENTS

| | | | | |
|---|---|---|---|---|
| 6,957,133 | B1 * | 10/2005 | Hunt et al. | 701/29 |
| 7,024,067 | B2 * | 4/2006 | Baker et al. | 385/15 |
| 7,167,104 | B2 * | 1/2007 | DiPiazza | 340/905 |
| 2002/0070852 | A1 | 6/2002 | Trauner et al. | |
| 2003/0099426 | A1 * | 5/2003 | Baker et al. | 385/15 |
| 2005/0246100 | A1 * | 11/2005 | Nath et al. | 701/301 |
| 2005/0276318 | A1 * | 12/2005 | Bokhour | 375/219 |
| 2005/0280552 | A1 * | 12/2005 | DiPiazza | 340/905 |
| 2007/0276600 | A1 * | 11/2007 | King et al. | 701/301 |

FOREIGN PATENT DOCUMENTS

| | | | | |
|---|---|---|---|---|
| DE | 102006018723 | A1 | * | 10/2007 |
| EP | 1774675 | A1 | * | 4/2007 |
| WO | WO 2005109373 | A2 | * | 11/2005 |
| WO | WO 2006011123 | A1 | * | 2/2006 |
| WO | WO 2007121707 | A1 | * | 11/2007 |

OTHER PUBLICATIONS

B2 US 20050276318 A1, WO 2005119926 A2, EP 1749347 A2 6957133 B1 US 20030099426 A1, DE 10249153 A1, GB 2383432 A, GB 2383432 B, US 7024067 B2 DE 29813225 U1.*

Driver Behavior and Situation Aware Brake Assistance for Intelligent Vehicles; McCall, J.C.; Trivedi, M.M.; Proceedings of the IEEE; vol. 95, Issue 2, Feb. 2007 pp. 374-387; Digital Object Identifier 10.1109/JPROC.2006.888388.*

Short range radar—Being on the market; Wenger, J.; Microwave Conference, 2007. European; Oct. 9-12, 2007 pp. 1534-1537; Digital Object Identifier 10.1109/EUMC.2007.4405499□□.*

Automotive radar—status and perspectives; Wenger, J.; Compound Semiconductor Integrated Circuit Symposium, 2005. CSIC '05. IEEE, Oct. 30-Nov. 2, 2005 p. 4 pp.; Digital Object Identifier 10.1109/CSICS.2005.1531741.*

A vehicle-to-vehicle communication protocol for cooperative collision warning; Yang, X.; Liu, L.; Vaidya, N.H.; Zhao, F.; Mobile and Ubiquitous Systems: Networking and Services, 2004. MOBIQUITOUS 2004. The First Annual International Conference on Aug. 22-26, 2004 pp. 114-123; Digital Object Identifier 10.1109/MOBIQ.2004.1331717.*

3D image location surveillance system for the automotive rear-view; Sasaki, K.; Ishikawa, N.; Otsuka, T.; Nakajima, M.; Vehicle Navigation and Information Systems Conference, 1994. Proceedings., 1994; Aug. 31-Sep. 2, 1994 pp. 27-32 Digital Object Identifier 10.1109/VNIS.1994.396871.*

Inflight path planning replacing pure collision avoidance, using ADS-B; Holdsworth, R.; Lambert, J.; Harle, N.; Aerospace and Electronic Systems Magazine, IEEE; vol. 16, Issue 2, Feb. 2001 pp. 27-32.*

Keeping cars from crashing; Jones, W.D.; Spectrum, IEEE, vol. 38, Issue 9, Sep. 2001 pp. 40-45 Digital Object Identifier 10.1109/6.946636.*

Bluetooth, "All Products" from www.bluetooth.com.

Bluetooth, "What are some of the technical details of the Bluetooth wireless specifications?" from www.bluetooth.org.

Bluetooth, "In what kinds of products can I expect to find Bluetooth wireless technology?" from www.bluetooth.org.

Bluetooth, Bluetooth Enabled Products-Handheld Gryphon BT100-CS Bluetooth Cordless System from www.bluetooth.com.

Datalogic, Products from www.datalogic.com.

Infrared Data Association (IrDA), "IrDA Specifications and Technical Notes" from www.irda.org.

Infrared Data Association, "Point and Shoot Profile," Version 1.1, Mar. 20, 2000 from www.irda.org, pp. 1-34.

Polgreen, Lydia, New York Times, "To Get the Phone, Drivers are Willing to Risk Getting a Ticket," Sep. 2, 2003.

Job, Ann, "How to Deal with Distracted Drivers," report from http://Autos.msn.com/advice.

* cited by examiner

Diagramatic
Lateral View - I
18
17
15
12
10
11
14
12
Moving Vehicle approaching the Object Communication Interface
Client Controller
Main Controller
Client Controller
17
15
12
12
12
15
11
17
15

Interface with IMD

Interface with ACARS
25
26
ACARS
12
16
11
Main Controller

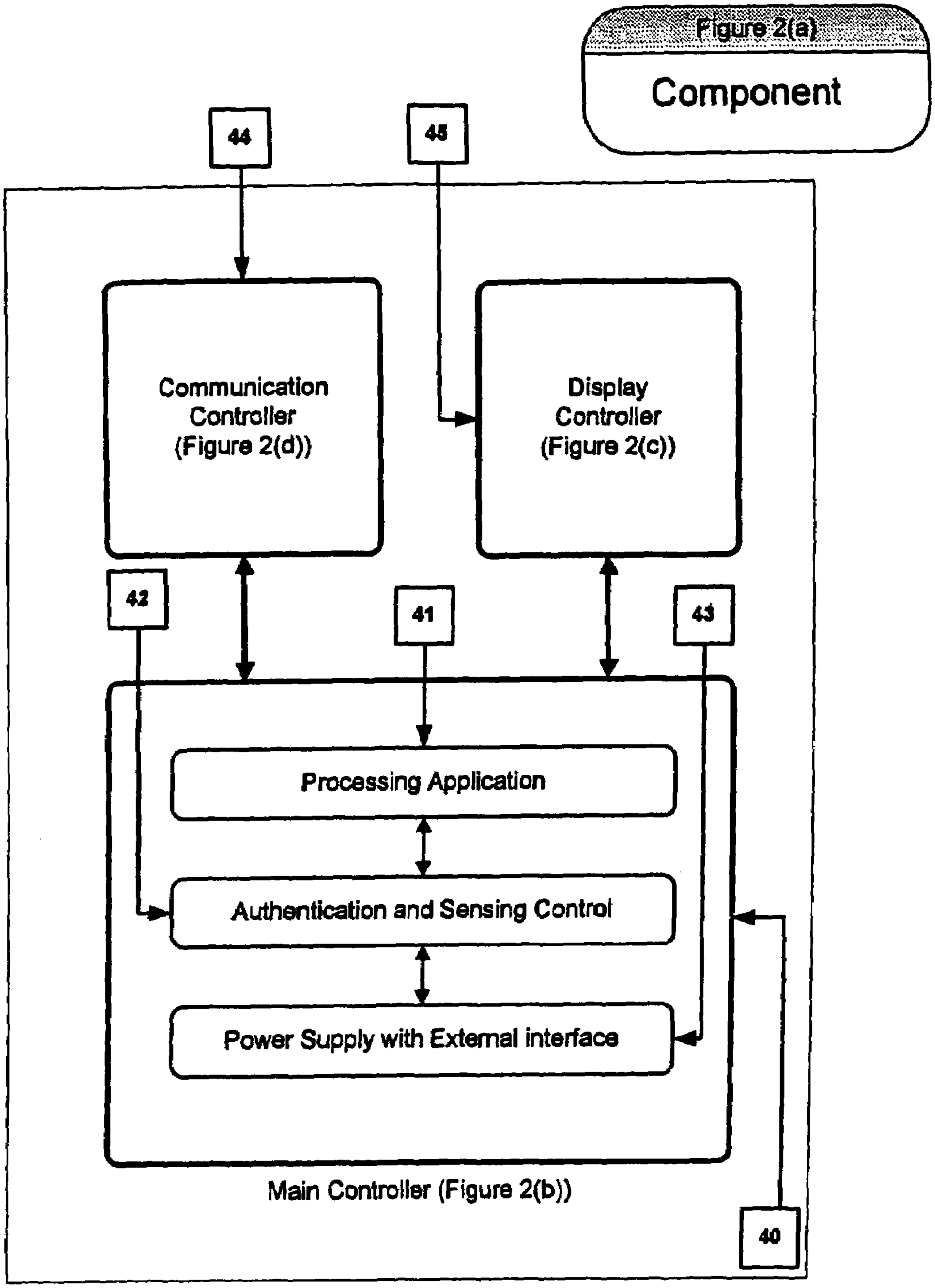
I.W.S.D Components

Main
57
58
59
I / O Controller
Connector II
Visual/Display Interface
56
60
Authentication Module
61
Communication Interface
54
Connector III
ROM
RAM
50
55
51
Processor
Program
Data Storage
53
52
63
64
62
External Interface
Power Adapter
Power Connector Display
74
Visual Interface
Display Screen
75
73
Location Visualisor
70
72
Visual Processor
I/O Interface
71
76
Axuilary Adapter
77
78
OUTPUT ADAPTER
CONNECTOR II Communication Client Component
109
110
DISPLAY ADAPTER
DISPLAY
104
100
READ ONLY MEMORY
108
LOCATION VISUALISOR
103
RANDOM ACCESS MEMORY
DATA STORAGE
100
102
Microprocessor
Application
115
106
101
105
BEAM EMMITTER
SENSOR BEAM
100
107
BEAM RECEIVER
ALERT SENSOR
111
112
114
113
OUTPUT ADAPTER
Power Adapter
Power connector System Flow

IMMINENT COLLISION WARNING SYSTEM AND METHOD

FIELD OF INVENTION

The invention is generally related to automatic sensing devices. In particular, the invention is related to a system and method for automatically sensing the distance between objects that are converging to or diverging from each other. More specifically, the present invention involves a system and a method that provide both audible and visual warning of an imminent impact of a moving object with an individual using a personal device.

BACKGROUND OF INVENTION

Present state of the art provides numerous devices and methods for locating, tracking and monitoring the movement of objects in relation to each other. These devices range from determining the relative trajectories of subatomic particles to the plotting the relationship between global positioning satellites to traffic collision avoidance systems used in aviation, such as those described in U.S. Pat. No. 6,690,296, U.S. Pat. No. 6,690,295, U.S. Pat. No. 6,636,752, U.S. Pat. No. 6,525,674 and U.S. Pat. No. 6,356,855, which are incorporated herein in their entirety. However, they are usually complicated and cumbersome to be useful in ordinary daily endeavors.

Monitoring and tracking a moving object is important in many applications. In certain applications, it is desirable to have a tracking device not only to locate the position of the object but also to monitor the movement of the object in real time without any significant delay.

For example, many tracking devices have been developed recently to locate objects that are not in close proximity. Many scanning devices scan for remote objects using radio frequency technology. Any of a number of techniques for locating objects can be readily adapted to locate moving objects. While these devices fulfill their respective particular objectives and requirements, the prior art does not suggest the novel imminent collision warning system disclosed herein.

SUMMARY OF INVENTION

The present invention advantageously uses state of the art electronic devices in new ways to improve the safety of individuals in their mobile lives. The electronic devices are easily portable and mobile, such as cellular phones, smart phones, personal digital assistants (PDA) and mobile computers. The present invention provides a system that recognizes any one of these popular devices, hereafter referred to as client devices, as carried by individuals or other objects, from a distance in such a manner that when the closure rate of the recognizing safety device and the client device exceed a predetermined set of criteria, the system automatically warns audibly and visually, preferably both parties, of the impending closure, to enable action to be taken to possibly avoid a collision. The system is flexible to meet the needs of the operators of vehicles using the present invention in that a main controller of the system can be configured to set different sizes of safety zones that would set off an alarm when violated, or that the running condition of the engine of the vehicle can be monitored, and also appropriate authorities automatically informed of an event that may require immediate assistance.

An embodiment of the present invention involves an Imminent collision warning system comprising a safety device, the safety device further comprising a main controller, and a display controller. A plurality of client devices communicate with the main controller. Another set of monitoring devices are also capable of communicating with the main controller and the plurality of client devices. The main controller keeps track of the proximity of the plurality of client devices, including other safety devices, and issues timely warnings of an impending collision between the safety device and the plurality of client devices.

An aspect of an embodiment of the present invention comprises a system for: determining the distance between the moving and stationary and/or moving object; using a communication device to transmit a rate of change of the distance between the moving and stationary and/or moving object. The system further provides sensing: the presence of objects in the pedestrian crossing; the presence of objects in the intended path of a vehicle; the movement of objects in an incorrect direction; the movement of objects in an incorrect location; the passing of moving objects through a traffic control device; determining whether the velocity of the vehicle exceeds zero velocity (in any direction); informing the objects if the velocity of the approaching vehicle is greater than zero. The system also provides sensing whether the said objects are not following the appropriate control functions of the traffic control devices; and uses emergency designations for reporting the impending collision.

In another aspect of an embodiment of the present invention, a method is provided for monitoring and supplying a warning of an impending collision between a moving and a stationary and/or moving object. The method provides sensing the presence of an object in the path of a vehicle whether stationary or moving; determining the distance of separation between the vehicle and the said object, determining that the vehicle is moving along a collision path; determining the speed of reduction of distance between the vehicle and said object, the distance approaching a defined zone; generating a warning to an operator of the vehicle as well as to the object on a collision course; sensing an impending event, including an accident; summoning appropriate authorities, including police to the event; and summoning immediate emergency care.

BRIEF DESCRIPTION OF DRAWINGS

FIG. 1(*b*) an exemplary systematic diagram of communication interface between ICWS modules, according to a first embodiment of the present invention;

FIG. 1(*c*) is a flowchart of an exemplary process, in which an ICWS interacts with a intelligent monitoring device (IMD), according to at least one embodiment of the present invention;

FIG. 1(*d*) is a flowchart of an exemplary process, in which an ICWS interacts with an automobile registry communication system (ARCS), according to at least one embodiment of the present invention;

FIG. 2(*b*) depicts an exemplary functional block diagram of a main controller device;

FIG. 2(*c*) depicts an exemplary functional block diagram of a display device;

FIG. 2(*d*) depicts an exemplary functional block diagram of a communication device;

DETAILED DESCRIPTION

Figure 1A:
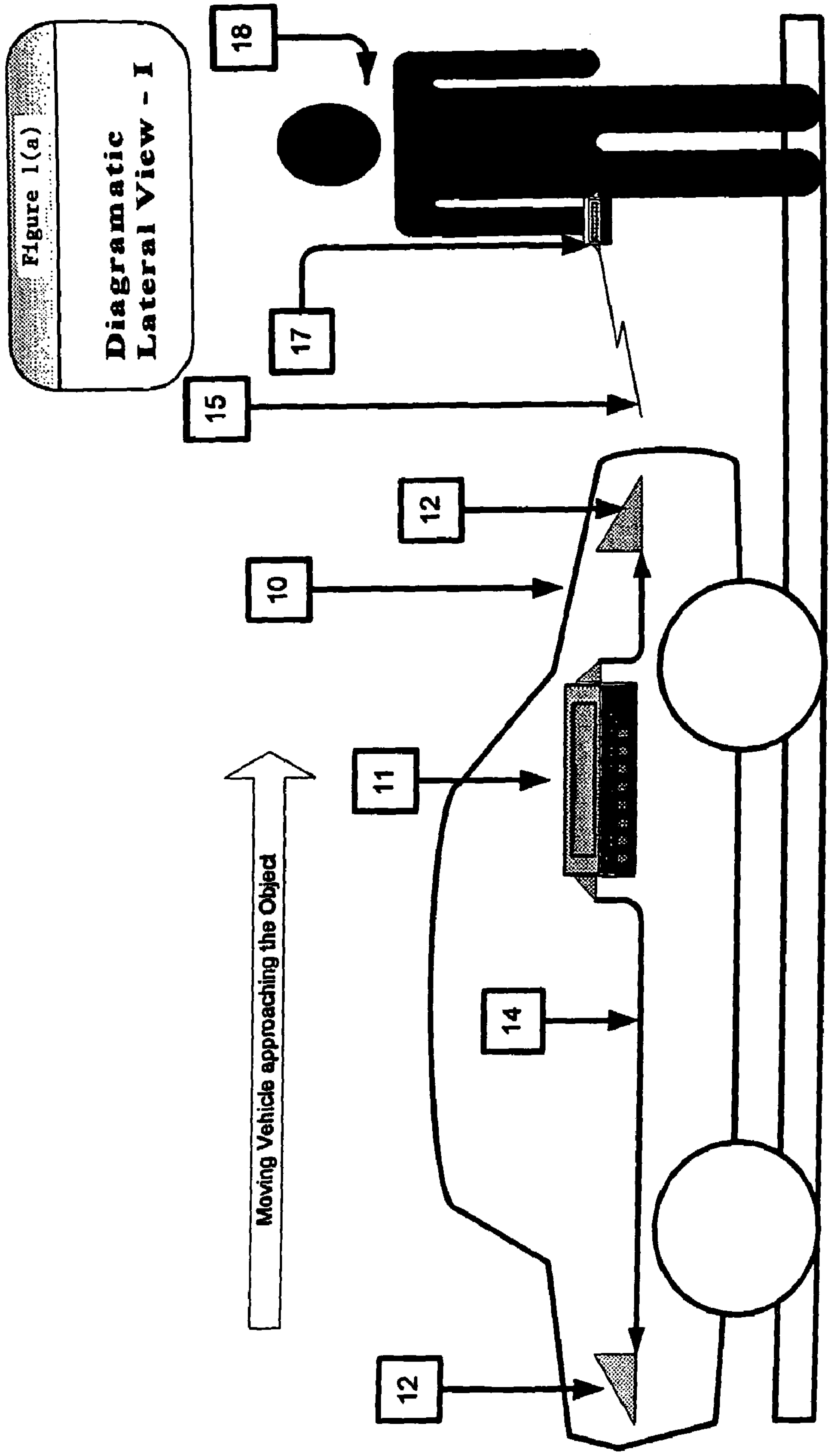
FIG. 1(*a*) depicts an exemplary lateral view of an imminent collision warning system with an arrangement to ensure wireless communications among it's components, according to the first embodiment of the present invention.
Figure 1B:
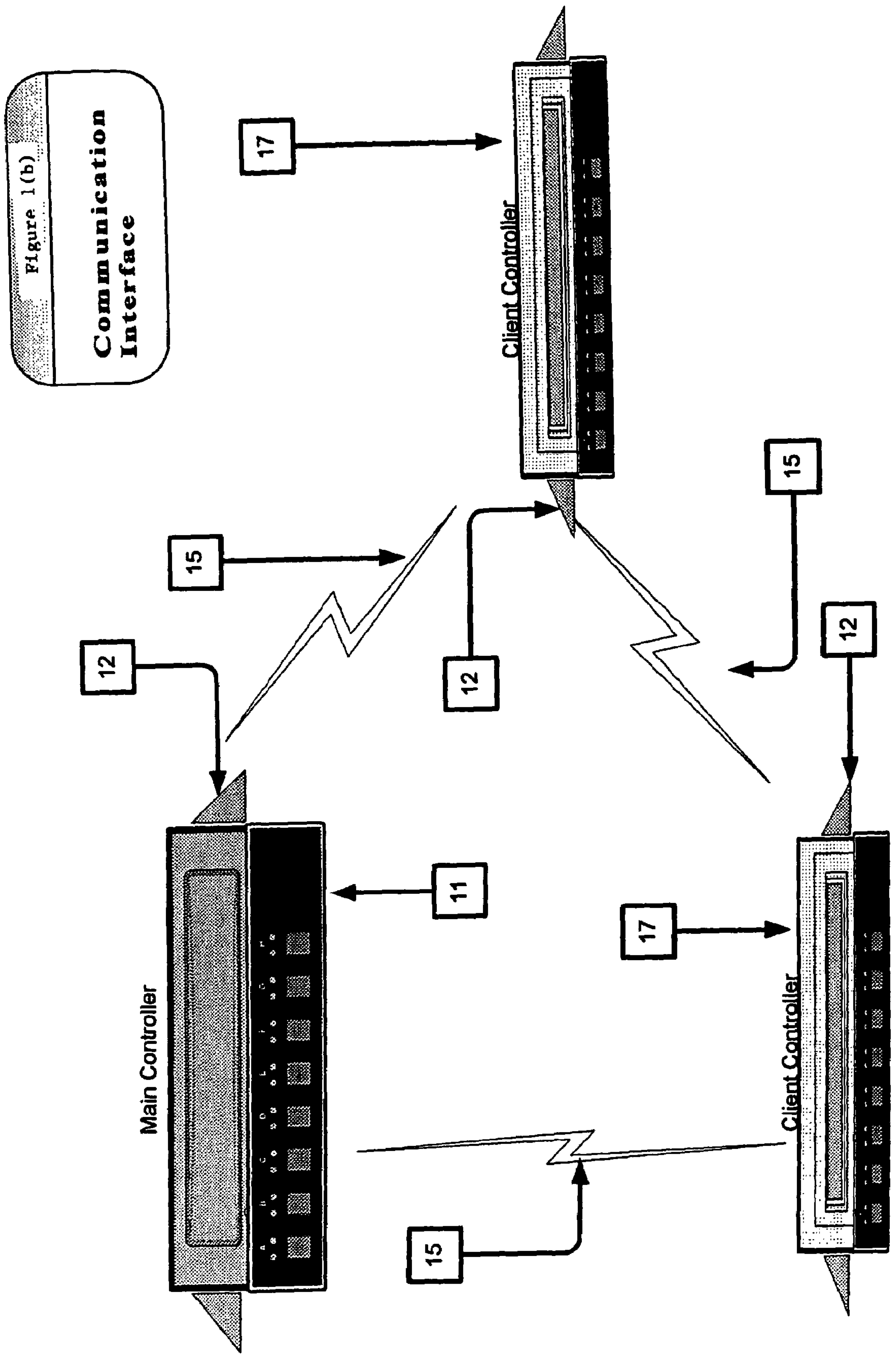
Figure 1C:
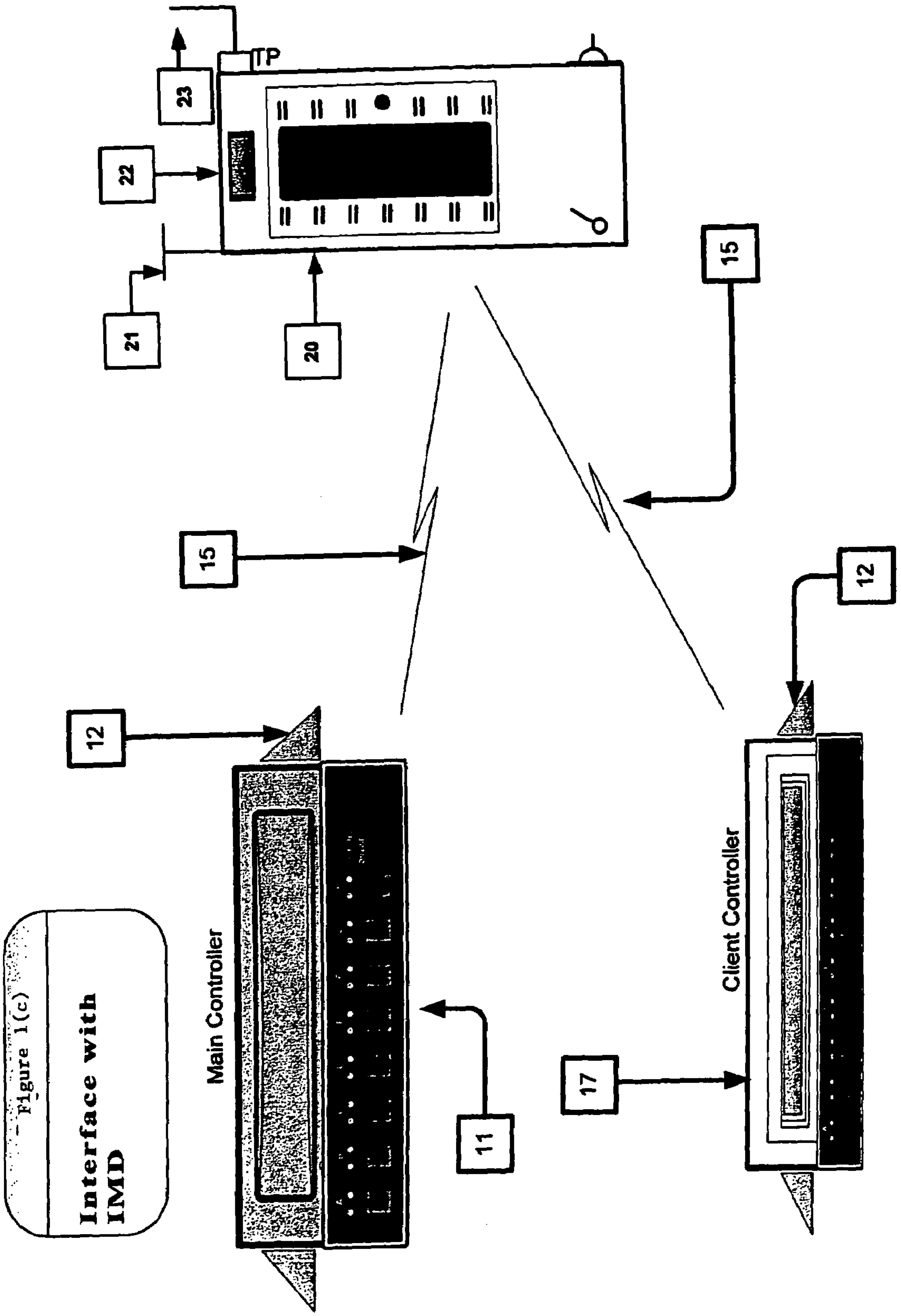
Figure 1D:
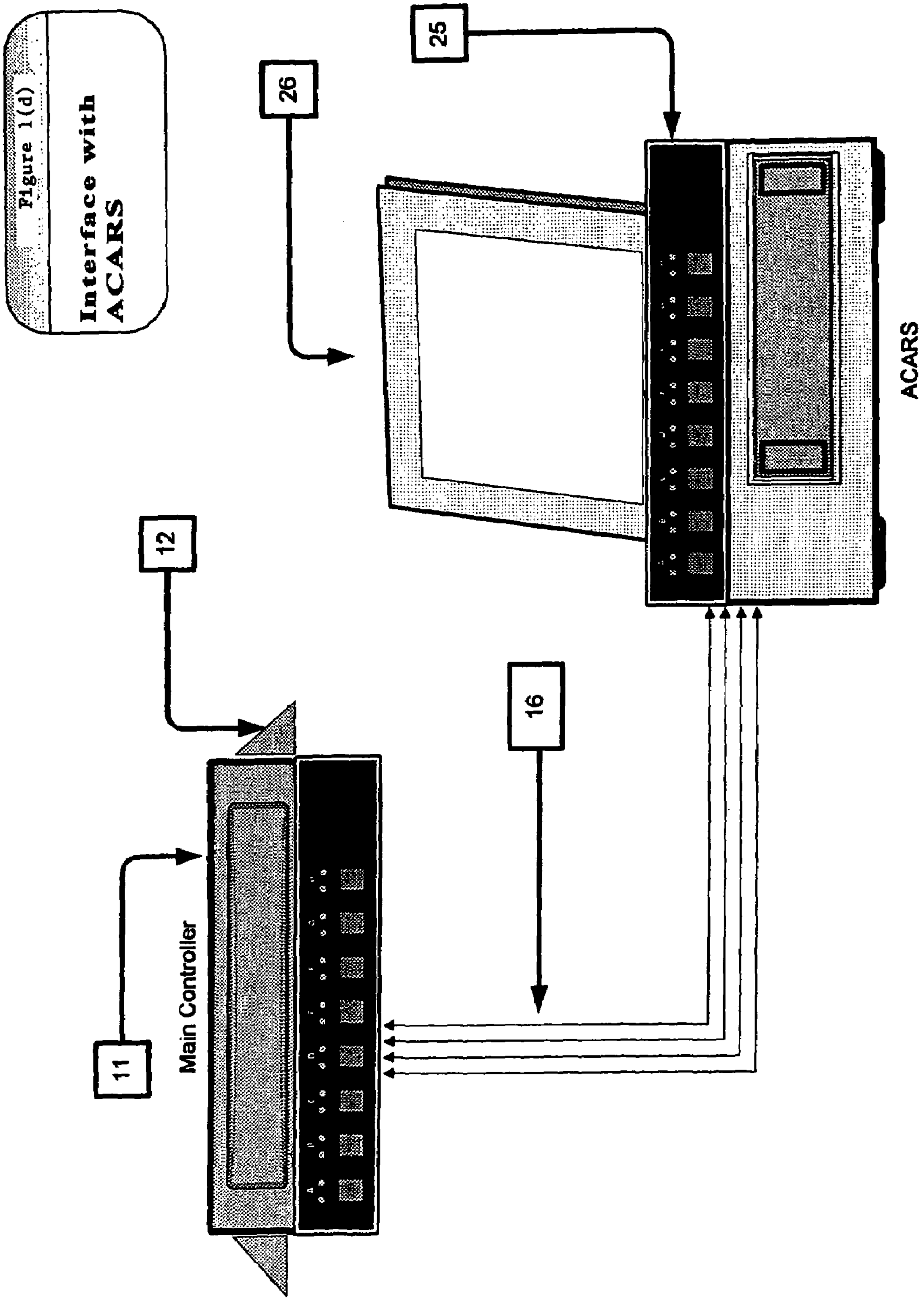

The present invention imminent collision warning system (ICWS) is described in detail below. Figures illustrate the systematic arrangement for providing and maintaining communications between the Main ICWS and the client ICWS, including the use of Intelligent Monitoring Devices (IMD) or Automobile Registry Communication System (ARCS).

Structures of an exemplary IMD. and ARCS are disclosed in pending U.S. patent application Ser. No. 10/704,456 filed on 7 Nov. 2003, and U.S. patent application Ser. No. 10/741,855 filed on 20 Dec. 2003, which are incorporated by reference in their entirety herein. By receiving a request the system can automatically collect the data and other relevant information pertaining to any particular vehicle (e.g. ownership, insurance, licensing etc.)

As would be understood by one of ordinary skill in the art, ICWS can be used in many different situations, e.g., to determine the rapidity of reduction of distance between two objects, to sense the presence of a pedestrian or another object in the pedestrian crossing or in the intended path of a vehicle, to warn a individual about an imminent collision, to sense the presence of an object in the intended path of a vehicle, to sense the movement of an object in an incorrect location or to a vehicle being operated contrary to the rules and regulations in effect.

FIG. 1.0 depicts one embodiment of the present invention. Shown is a system diagram of a Main controller of the imminent collision warning system (ICWS) interacting with a client controller of the imminent collision warning system (ICWS). The system is designed to provide an early warning of an imminent collision.

FIG. 1.0 depicts an exemplary diagrammatic lateral view of an automobile mounted with the Main ICWS with an arrangement to ensure wireless communications with the client ISWD, according to a first embodiment of the present inventions.

In FIG. 1(*a*), an operator is in a movable vehicle 10 mounted with the Main ICWS 11. The movable vehicle 10 may correspond to a vehicle that is movable such as an automobile, a truck, a train, a bus, a boat, an airplane, a bicycle or a motorcycle. The client ICWS 17 can operate independently or can be mounted on a portable device. The portable device may be, for example (without limitation) a wireless cellular phone, compact disk (CD) player, portable video player or a personal digital assistant (PDA) with wireless capabilities, or a mobile personal computer.

The front and rear of the movable vehicle 10 is mounted with the sensor beacons 12. The front and rear sensor beacons 12 are connected through connection 14 to the main controller ICWS 11. The main ICWS 11 communicates wirelessly 15 with the client ICWS 17.

The object 18 encompasses individuals with portable devices, children, inattentive or impaired individuals.

FIG. 1(*b*) depicts an exemplary communication interface of the Main ICWS 11 with the Client ICWS 17, according to the first embodiment of the present invention. The vehicle mounted with the Main ICWS 11 can simultaneously wirelessly 15 communicate with "n" number of client ICWS 17's. The main ICWS 11 and the client ICWS 17 are connected with a pair of sensor beacons 12. This is an emitter which transmits a signal beam around the movable vehicle. In this depicted embodiment, the Sensor beacon 12 can be installed on the front, rear and sides of the vehicle covering the area adjoining the entire circumference of the movable vehicle.

The sensor beacon 15 may correspond to a radio frequency, WLAN IEEE 802.11x & 802.16x standards, a Bluetooth, an IR port, a laser technology or an optical technology.

The signal used for transmission can be accomplished via radio frequency, WLAN IEEE 802.11x & 802.16x standards, Bluetooth an IR port, a laser technology or an optical technology, where the wireless 802.11x covers the area of about 3 block, the wireless 802.16x covers the area of about 7 miles, a blue tooth system covers a diameter range of around 330 feet and an "IrDA" infrared red system generally covers less than 5-10 feet with a proper line of sight. This technology as is described in greater detail below The Bluetooth's native ad-hoc network property makes it very useful by replacing bulky cables, providing printing support or acting as ID cards. The Bluetooth wireless specification includes both link layer and application layer definitions for product developers, which support data, voice, and content-centric applications. Handheld wireless communication devices that comply with the Bluetooth wireless specification operate in the unlicensed, 2.4 GHz radio spectrum ensuring communication compatibility worldwide. These radios use a spread spectrum, frequency hopping, full-duplex signal at up to 1600 hops/sec. The signal hops among frequencies at 1 MHz intervals to give a high degree of interference immunity. Up to seven simultaneous connections can be established and maintained. Further details can be viewed at www.bluetooth.org or www.bluetooth.com.

The Infrared Wireless Adaptor (IrDA) specifications, on the other hand, is intended for high speed short range, line of sight, point-to-point cordless data transfer—suitable for handheld communication devices. Since 1984, "IrDA Data" defines a standard for an interoperable universal two way cordless infrared light transmission data port. IrDA technology is already in over 300 million electronic devices including PC's, PDA's, cellular phones, cameras, toys, watches and many other mobile devices. Main characteristics of IrDA signaling include:

- Range: Continuous operation between two contacts for at least 1 meter.
- Bi-directional communication is the basis of all specifications.
- Data transmission starting from 9600 kbps primary speed going up to 4.0 mbps.
- Data packets are protected using CRC (from CRC 16 for speeds up to 1.152 mbps to CRC-32 at 4.0 mbps).

Radiofrequency (RF) is another name for radio waves. It is one form of electromagnetic energy that makes up the electromagnetic spectrum. Electromagnetic energy consists of waves of electric and magnetic energy moving together (radiating) through space. The area where these waves are found is called an electromagnetic field.

Radio waves are created due to the movement of electrical charges in antennas. As they are created, these waves radiate away from the antenna. All electromagnetic waves travel at the speed of light. The major differences between the different types of waves are the distances covered by one cycle of the wave and the number of waves that pass a certain point during a set time period. The wavelength is the distance covered by one cycle of a wave. The frequency is the number of waves passing a given point in one second. For any electromagnetic wave, the wavelength multiplied by the frequency equals the speed of light. The frequency of an RF signal is usually expressed in units called hertz (Hz). One Hz equals one wave per second. One kilohertz (kHz) equals one thousand waves per second, one megahertz (MHz) equals one million waves per second, and one gigahertz (GHz) equals one billion waves per second.

RF energy includes waves with frequencies ranging from about 3000 waves per second (3 kHz) to 300 billion waves per second (300 GHz). Microwaves are a subset of radio waves that have frequencies ranging from around 300 million waves per second (300 MHz) to three billion waves per second (3 GHz).

Basically WLAN is an ordinary LAN protocol, which is a modulated carrier of radio frequency waves. WLAN IEEE 801.11 is a natural extension to LAN Ethernet, and the modulated protocol is IEEE 802.3 (Ethernet 3).

Common WLAN Products, which are using IEEE standards, are based on IEEE 802.11 and 802.11b specification. 802.11b is a high rate extension to the original 802.11, and specific 5.5 to 11 Mbps data rate. The next HyperLAN2 generation using IEEE 802.11a, IEEE 802.11g standards, operates in a new band frequency of 5 GHz, and achieves a high data rate as 54 Mbps. The new networking technology WiMax IEEE 802.16x should provide higher speed, and more coverage than existing Wi-Fi standards.

FIG. 1.2 is an exemplary functional block diagram of interfacing ICWS 11 and 17 with an intelligent monitoring device (IMD) 20 which may be located on any roadside installation. The relevant information can be transmitted wirelessly 15 from ICWS 11 and 17 using the sensor beacons 12 to IMD 20.

An intelligent monitoring device (IMD) is located on a roadside installation 20. The device has an onboard central processing unit. The intelligent monitoring device (IMD) has a multi-line liquid crystal display (LCD) panel 22 capable of displaying detailed information related to the process executed, errors and equipment information displayed. The external interface is provided for maintenance purposes, in case equipments need configuration changes or updating the pre-existing applications or their sub modules. The signal processor differentiates between the incoming transmission via signal receiver 21 and outgoing transmission via signal emitter 23.

FIG. 1.3 is an exemplary block diagram of an interfacing ICWS 11 with an Automobile Communication and Registry System (ACARS) 25 installed inside the vehicle. The ICWS 11 can be operated independently or can be harnessed with ACARS 25.

Figure 2B:
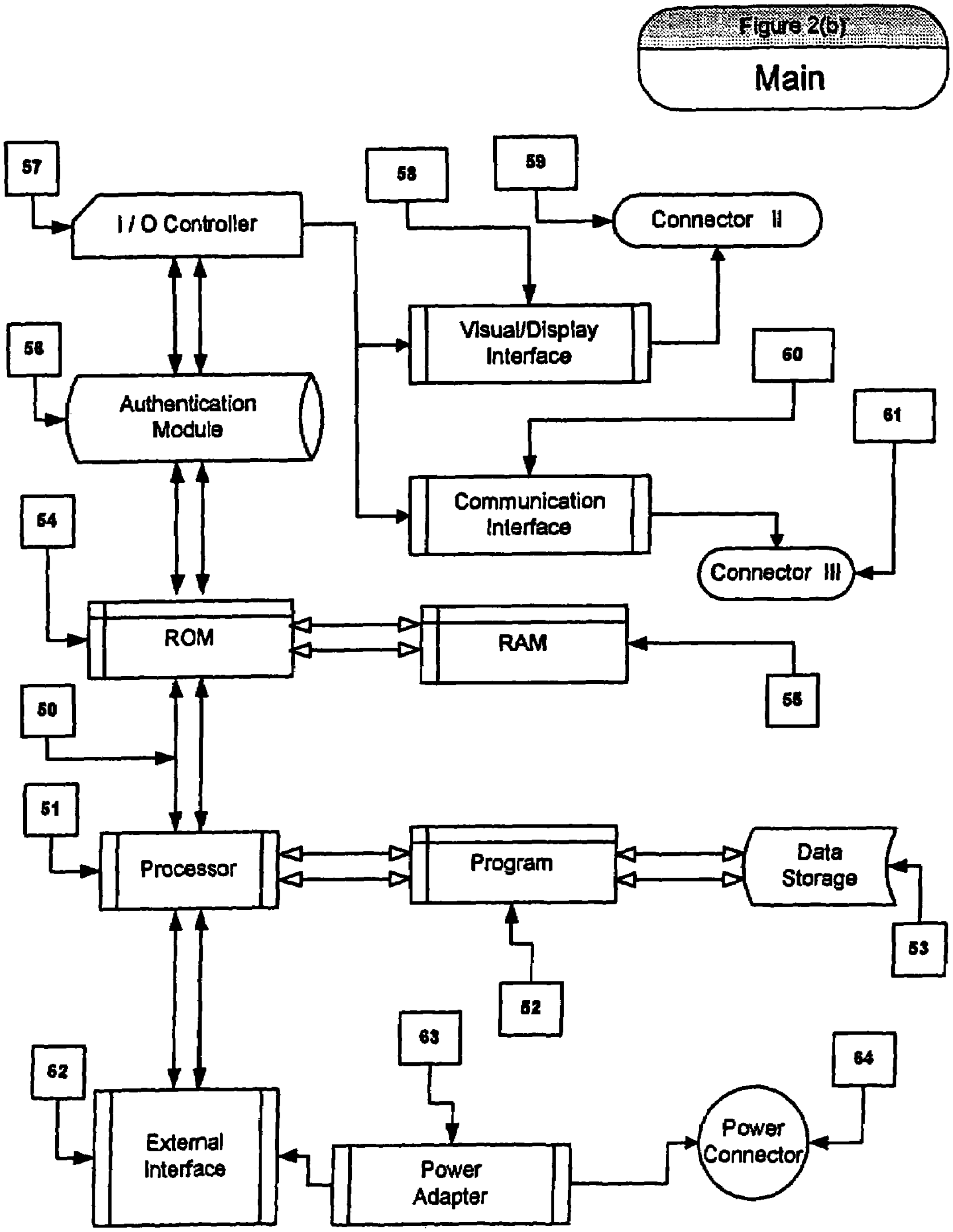
FIG. 2(*a*) depicts an exemplary functional block diagram of an ICWS, according to at least one embodiment of the present invention.
Figure 2C:
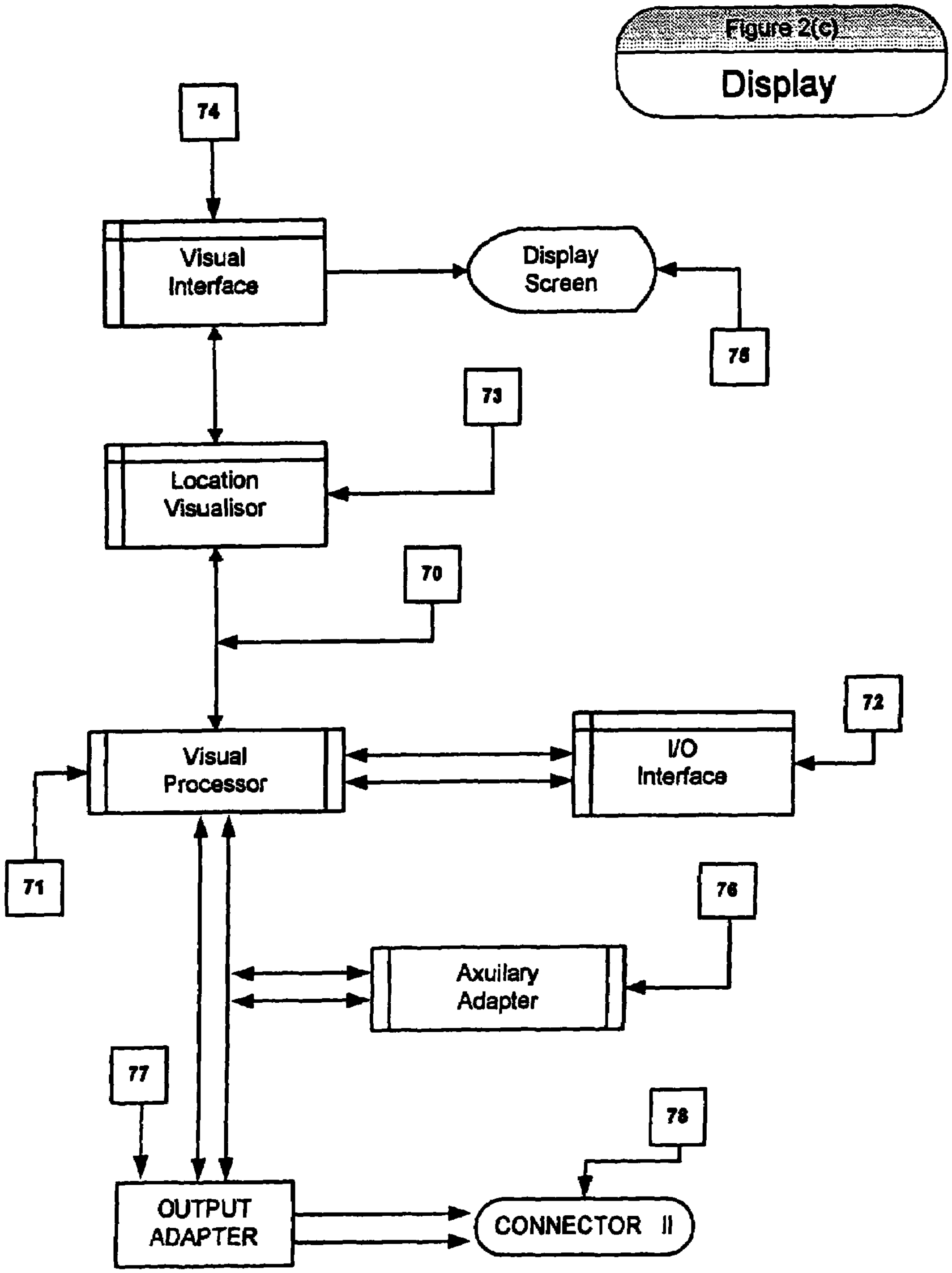
Figure 2D:
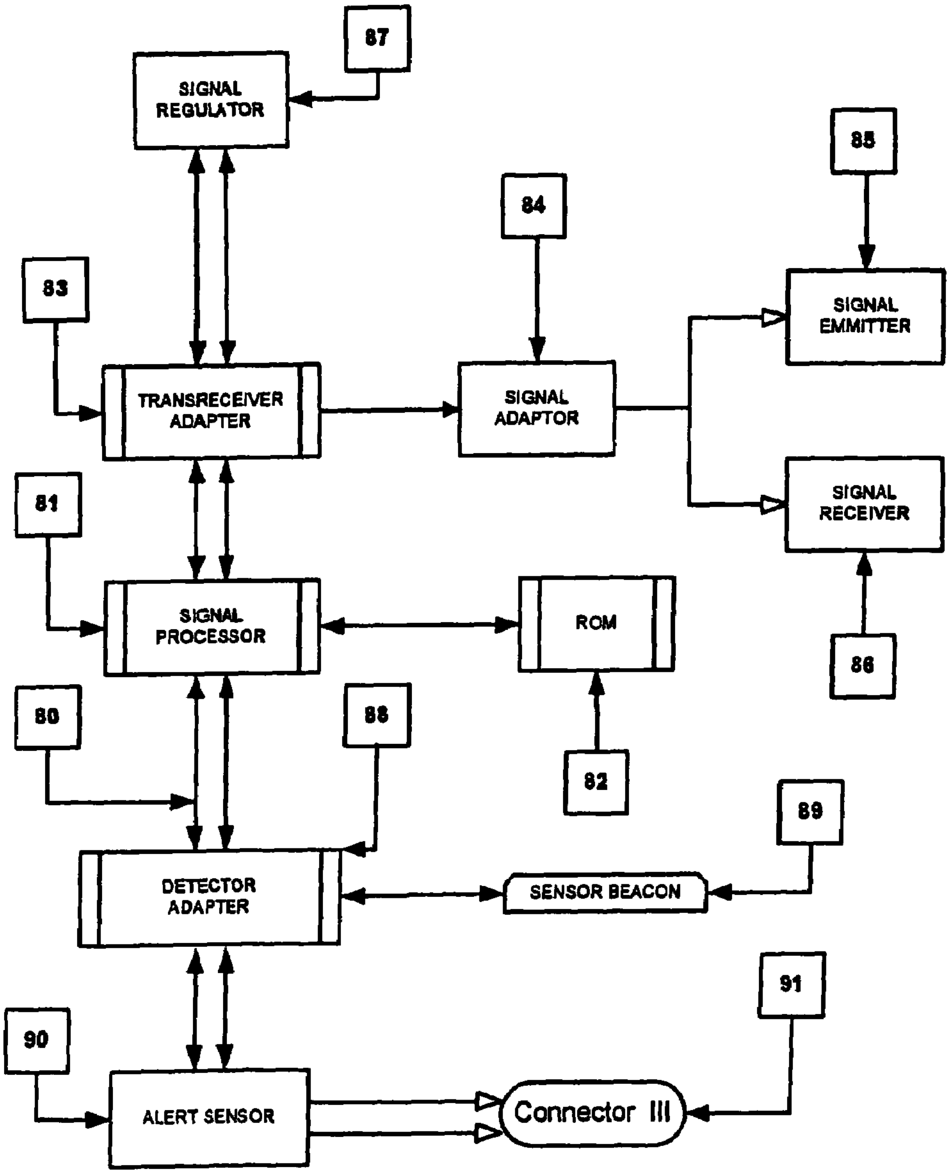

FIG. 2(*a*) is an exemplary block diagram of major components of ICWS. There are 3 major components of the imminent collision warning system (shown below). All the components are connected to one another via external adapters and connectors or can share the same system bus. Any of these major components can be installed independently or with other external applications e.g. IMD, ACARS.

Main Controller 40;

Communication Controller 44;

Display Controller 45;

The three major components comprised of a Main controller 40: a) Processing Application/Application Processor 41; b) Authentication and Sensing Control 42; c) Power supply and External Interface 43. All the components are connected to one another and share the same system bus.

FIG. 2(*b*) is an exemplary architectural diagram of the main controller 40. The figure describes a computer control system that functions as a main onboard controller for various types of functions, including the control of the portable device used by other objects. A central processing unit 51 is provided and interconnected to various other components via a system bus 50. An operating program 52 running on the processor 51 provides control and may be used to coordinate the functions of the various components of the control system. The operating system 52 may be stored in Random Access Memory (RAM) 55, deployed in an ICWS and may have sufficient memory such as 64 or 256 megabytes of storage space. Other connectivity application for different control functions may be stored in Read Only Memory (ROM) 54. Such stored application programs may be moved in and out of RAM 55 to be executed so as to perform their respective functions.

Application program 52 deployed on the computer control system may include the ICWS constructed and configured according to different embodiments of the present invention. All the transactions recorded by the ICWS are stored on an internal storage device 53.

An external interface 62 is provided for external connectivity to the automobile onboard control system or with any other onboard application e.g. ACARS, IMD etc The power adapter 63 provides universal connectivity connector 64 which can be easily interfaced with the main power supply or any other type of auxiliary device e.g. battery, solar panel or any other third party device. The display controller and communication controller are controlled through an input/output (I/O) controller 57. The visual Display interface 58 is a universal connectivity controller and provides a universal connector “Connector II” 59. The same I/O Controller 57 also provides universal connectivity via communication interface 60 and provides a universal connector “Connector III” module 61.

According to the present invention, the control system may detect that the vehicle is in motion through sensors positioned at one or more locations of the vehicle. For example, a motion may be detected because it is sensed that the vehicle velocity is greater than zero (in any direction). Motion may be sensed when it is detected that the park mode of the vehicle is not selected. Motion of vehicle may be sensed when the drive mode is selected or a neutral mode is selected with brakes not fully engaged. Other alternatives to detect the motion of the vehicle may be employed which would be understood by any one of ordinary skill in the art.

The authentication module 56 keeps the authentication track of I/O controller’s devices and inters ICWS communication. Also performs the authentication procedure when two of more Main controller or client application is active.

FIG. 2(*c*) is an exemplary architectural diagram of display controller 45. The referring figure describes a display control system that functions as a sub class event of the main controller to display various types of messages including the error control message, installation or configuration procedures or any relevant information pertaining to the event executed. The display adapter is connected to “Connector II” 78. The output adapter 77 regulates the power supply mechanism and different miscellaneous functions. The auxiliary adapter 76 is designed to provide connectivity of the main controller with other ancillary devices. A visual processing unit 71 is provided and interconnected to various other components via a system bus 70. A location visualiser 73 provides the location of multiple other objects and their spatial relationship to one another. Finally the visual interface 74 feeds the transmission to the onboard screen 75 or to any other third party display units. The wireless system according to the invention contains the main controller is capable of recognizing a client device carried by an individual moving in any direction within the electromagnetic view of the controller.

FIG. 2(*d*) is an exemplary architectural diagram of the communication controller 44. The referring figure describes a communication control system that functions as a sub class event of the main controller to sense and authenticate the presence of the client or main ICWS devices. The communication adapter is connected to "Connector III" 91. The Detector Adapter 88 continuously scans via several sensor beacons 89 for the presence of other ICWS's in the immediate vicinity. As soon as the sensor beacon 89 detects the presence of another ICWS the signal processor 81 initiates the communication channel. The ROM 82 is provided to load the application in case the communication controller is installed independently. The transreceiver adapter 83 in conjunction with signal adapter 84 keeps the communication channel live until the proper termination sequence is executed. The signal emitter 85 and signal receiver 86 are connected to the signal adapter 84 to provide an enhanced bandwidth. The signal regulator maintains the quality of the transmission. Based on the information acquired the Alert sensor 90 provides a visual and audio alert message depending on defined scenarios or detection of another ICWS.

Figure 3:
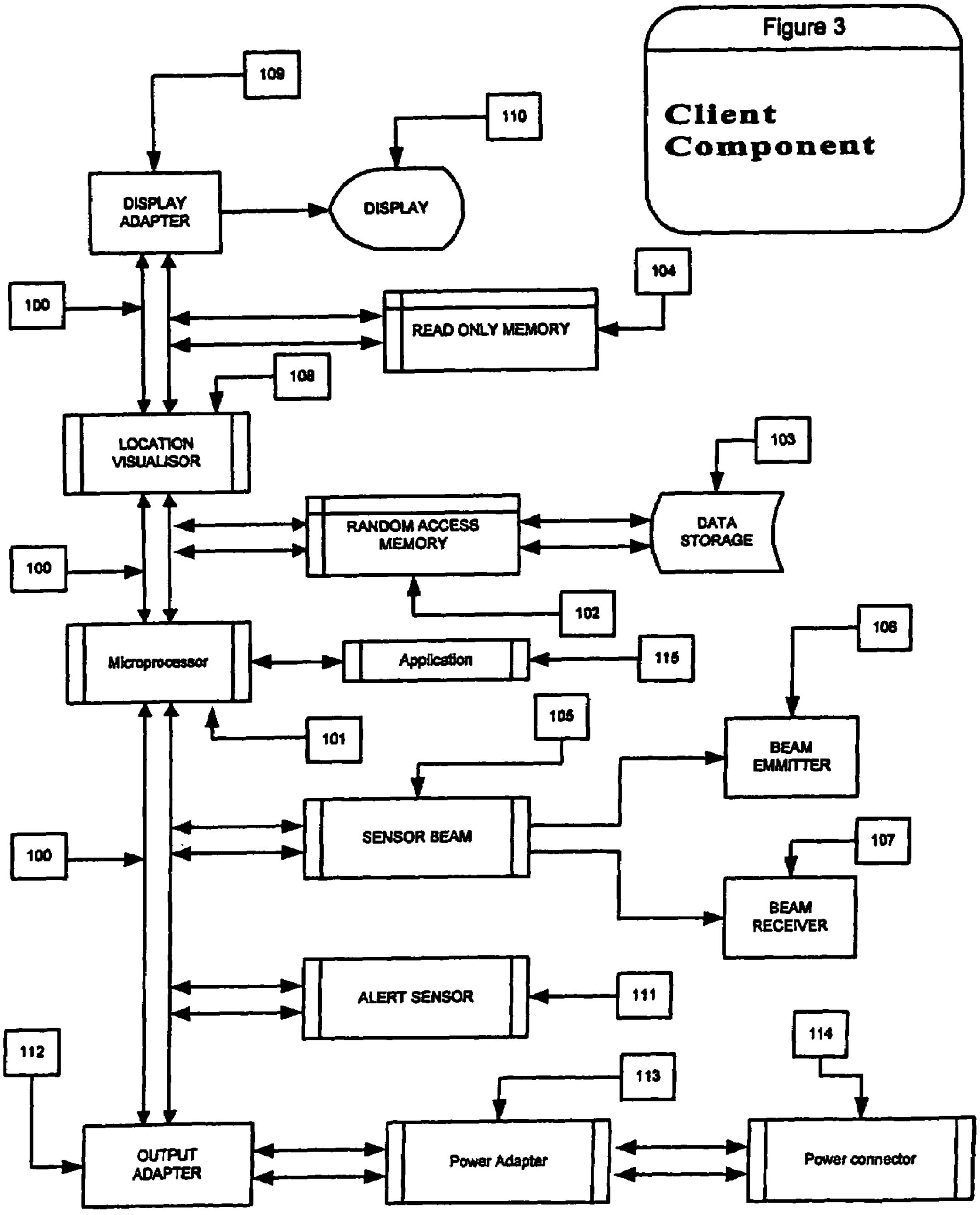
FIG. 3 depicts an exemplary functional block diagram of an client module of ICWS, according to at least one embodiment of the present invention.

FIG. 3 is an exemplary architectural diagram of the client component of ICWS. The three major components are assembled together to make one combined functioning device.

The embodiment describes a client control device that functions as an onboard controller for various sub-functions, including the control of the handheld device used by a stationary or movable object. A microprocessor 101 is provided and interconnected to various other components via a system bus 100. An application program 115 running on the microprocessor 101 provides control and may be used to coordinate the functions of the various components of the control system. The application program 115 is stored in data storage 103. Various application programs for monitoring and control of different functions are stored in read only memory 104. Such stored application programs may be moved in and out of RAM 102 to be executed and to perform their respective functions.

An Output adapter 112 is provided for external connectivity to any other application e.g. CD player, Portable Video player, Cell Phone, PDA, etc. . . . The power adapter 113 is provided with a universal connectivity connector 114 which can be easily interfaced with the main power supply or any type of auxiliary device e.g. battery, solar panel or any other third party device. It can have its own redundant power supply in case the main power supply fails or is intentionally disabled.

A location visualiser unit 108 is provided and interconnected to other components via a system bus 100. A location visualiser 108 provides the spatial relationship with other ICWS devices. The visual interface 108 feeds the data to the onboard display panel 110 via display adapter 109.

The sensor beacon 105 continuously scans for the presence of other ICWS devices within immediate vicinity. As soon as the sensor beacon 105 detects the presence of another ICWS, the beam emitter 106 and beam receiver 107 communicate the data and maintain the quality of the transmission. Based on the information acquired the Alert sensor 111 provides a visual and audio alert message.

Figure 4:
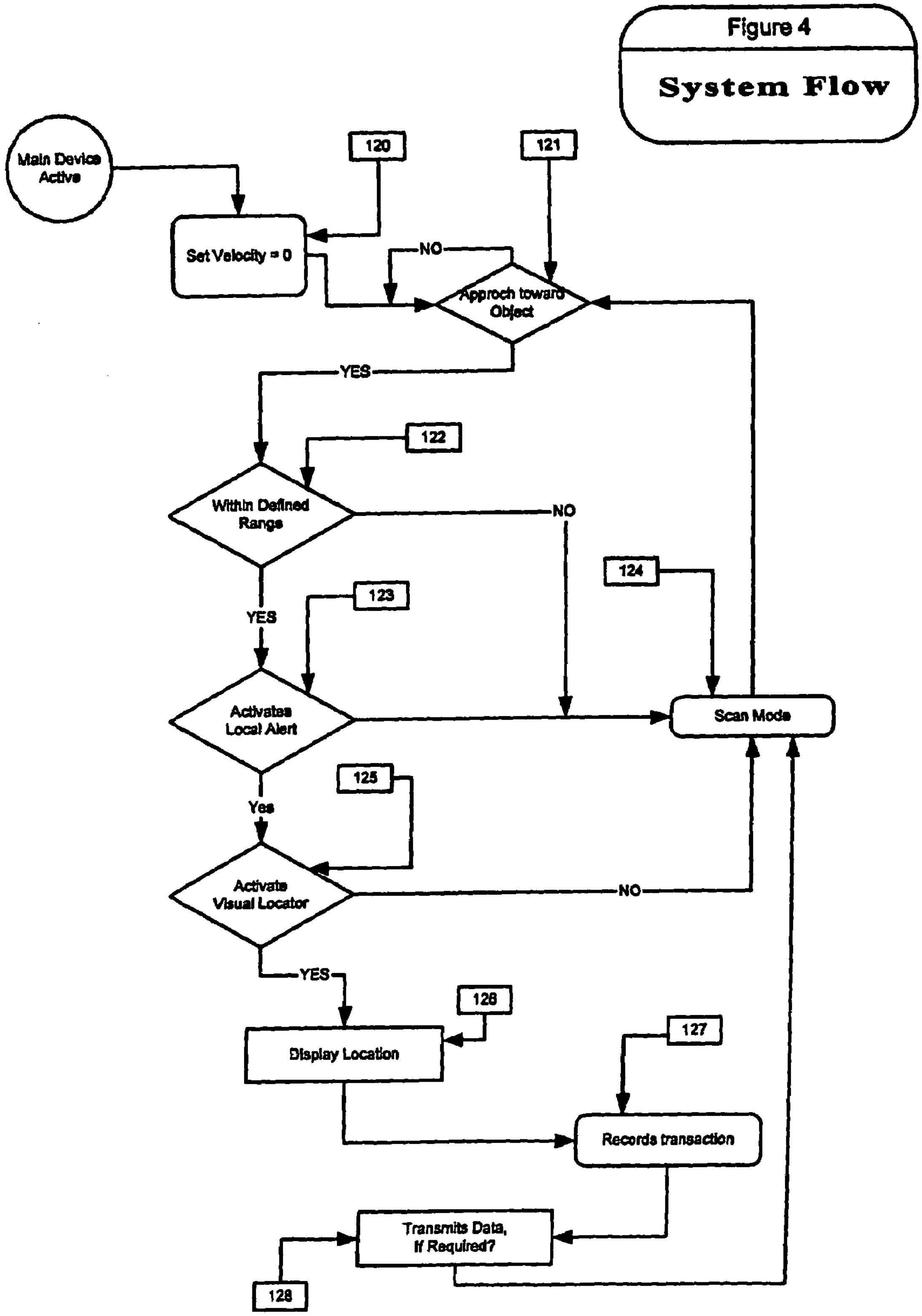
FIG. 4 depicts an exemplary flow diagram of an ICWS defining the steps involved.

FIG. 4 represents a flowchart of an exemplary process of imminent collision warning system (ICWS). At step 120 the velocity of the mobile object is initialized to zero. At step 121 the ICWS device scans the rapidity of reduction of the distance between two or more moving and/or stationary objects. At step 122 the device scans for mobile/stationary objects that fall in a predefined range or alert range of the second mobile/stationary object. Step 123 the local alert is executed when the mobile/stationary objects comes in the alert zone of second mobile/stationary object. The alert alarm is activated and transmits the visual and audio signals. At step 125 the Location visualiser is activated and the spatial relationship with other ICWS devices is established. Step 126 the visualized spatial relationship with other ICWS devices is displayed on the display panel. At step 127 the transaction is logged in. In step 128, if necessary the log is transmitted to the appropriate authorities.

What is claimed is:

1. An imminent collision wireless warning system comprising:

a safety device with a main controller and a display controller;

a plurality of a client device wirelessly communicating with the main controller;

a plurality of a monitoring device communicating with the main controller and the plurality of a client device; and wherein the main controller keeps track in proximity of the plurality of a client device, and issues a timely warning of an impending collision between the safety device and the plurality of a client device; and/or issues a timely command to the main controller wherein a central processing unit is operatively arranged to reduce engine output, and/or apply braking force, and/or transmission downshift so as to avoid the imminent collision with said plurality of a client device so as to enable a vehicle operator's collision avoidance maneuver.

2. The wireless system according to claim 1, wherein the safety device is mounted onto a vehicle.

3. The wireless system according to claim 1, wherein the client device is carried by a person.

4. The wireless system according to claim 1, wherein the monitoring device monitors both the safety device and the client devices.

5. The wireless system according to claim 1, wherein the monitoring device comprises an intelligent monitoring device (IMD).

6. The wireless system according to claim 1, wherein the monitoring device comprises an automobile registry communication system (ARCS).

7. The wireless system according to claim 1, wherein the main controller communicates directly with the client devices.

8. The wireless system according to claim 1, wherein the main controller communicates with the client devices through the monitoring device.

9. The wireless system according to claim 1, wherein communication between the main controller, the plurality of client devices and the monitoring devices is accomplished by utilizing radiation within the electromagnetic spectrum.

10. The wireless system according to claim 9, wherein communication between the main controller, the plurality of client devices and the monitoring devices is accomplished by utilizing WLAN IEEE 802.11x & 802.16x standards.

11. The wireless system according to claim 9, wherein communication between the main controller, the plurality of client devices and the monitoring devices is accomplished by utilizing Bluetooth standards.

12. The wireless system according to claim 9, wherein communication between the main controller, the plurality of client devices and the monitoring devices is accomplished by utilizing technologies comprising laser technology and optical technology; wherein the laser technology comprises an infrared wireless data transfer, and the optical technology comprises wireless 802.11x, 802.16x or an IrDA system.

13. The wireless system according to claim 1, wherein the main controller comprises a microprocessor, including an application processor capable of performing positional calculations, and an authentication sensor.

14. The wireless system according to claim 13, wherein the main controller transmits the positional calculations to the display controller, and the display controller displays the distance of any one client device relative to its own position.

15. The wireless system according to claim 14, wherein the main controller calculates a rate of change of distance between itself and any one of the client devices.

16. The wireless system according to claim 1, wherein the client devices are comprised of a CD player, a portable analog/digital video viewer, a smart phone, personal digital assistant, a mobile personal computer, or at least one of, or a combination thereof.

17. The wireless system according to claim 1, wherein the main controller is capable of recognizing a client device carried by said person moving in any direction within a range of an electromagnetic sensor or visualizer of the controller.

18. The wireless system according to claim 1, wherein the main controller is capable of determining a zone which is defined to be an area where a vehicle can be safely operated without risk of collision with an intruding client device.

19. The wireless system according to claim 18, wherein the zone is scanned for the safety of an operator of the vehicle equipped with such a safety device.

20. The wireless system according to claim 1, wherein the main controller is capable of providing early warning to the operator of the vehicle that an emergency vehicle is approaching contrary to rules and regulations in effect.

* * * * *